(12) United States Patent
Sahler et al.

(10) Patent No.: US 10,922,579 B2
(45) Date of Patent: Feb. 16, 2021

(54) FRAME RECOGNITION SYSTEM AND METHOD

(71) Applicant: Essilor International, Charenton-le-Pont (FR)

(72) Inventors: Jean Sahler, Charenton-le-Pont (FR); Adrien Boularot, Charenton-le-Pont (FR); Francois-Dumas Lattaque, Latkrabang Bangkok (TH); Vivien Pouget, Latkrabang Bangkok (TH)

(73) Assignee: Essilor International, Charenton-le-Pont (FR)

( * ) Notice: Subject to any disclaimer, the term of this patent is extended or adjusted under 35 U.S.C. 154(b) by 302 days.

(21) Appl. No.: 15/112,633

(22) PCT Filed: May 6, 2015

(86) PCT No.: PCT/IB2015/000845
§ 371 (c)(1),
(2) Date: Mar. 27, 2018

(87) PCT Pub. No.: WO2016/178048
PCT Pub. Date: Nov. 10, 2016

(65) Prior Publication Data
US 2019/0156146 A1 May 23, 2019

(51) Int. Cl.
*G06K 9/00* (2006.01)
*G06K 9/62* (2006.01)
(Continued)

(52) U.S. Cl.
CPC ....... *G06K 9/6215* (2013.01); *G06F 16/5854* (2019.01); *G06K 9/00671* (2013.01);
(Continued)

(58) Field of Classification Search
CPC ............. G06K 9/6215; G06K 2209/25; G06K 9/6202; G06T 7/90; G06Q 30/0635; G06F 16/5854
See application file for complete search history.

(56) References Cited

U.S. PATENT DOCUMENTS 7,702,673 B2 * 4/2010 Hull ........................ G06F 21/78
707/707
8,059,865 B2 * 11/2011 Deng ................. G06K 9/00711
382/103
(Continued)

OTHER PUBLICATIONS

International Search Report and Written Opinion dated Nov. 23, 2015; International PCT Application No. PCT/FR2015/051208.
(Continued)

*Primary Examiner* — Amir Alavi
(74) *Attorney, Agent, or Firm* — Oblon, McClelland, Maier & Neustadt, L.L.P.

(57) ABSTRACT

The disclosed embodiments provide an improved method for enabling consumers to identify and purchase a desired frame that is captured in an image. For example, in one embodiment, the disclosed embodiments include a frame recognition system that includes at least one processor for executing computer executable instructions for receiving an image; identifying a frame image from the image; performing image recognition using the frame image to identify a plurality of frames; retrieving merchant information corresponding to the plurality of frames; receiving merchant information associated with the plurality of frames; presenting the plurality of frames and the merchant information associated with the plurality of frames; receiving order information in response to a user ordering a frame from the plurality of frames; and processing the order information.

14 Claims, 5 Drawing Sheets

(51) Int. Cl.
  *G06T 7/90* (2017.01)
  *G06Q 30/06* (2012.01)
  *G06F 16/583* (2019.01)
  *G06K 9/46* (2006.01)
  *G06K 9/48* (2006.01)

(52) U.S. Cl.
  CPC .............. *G06K 9/4652* (2013.01); *G06K 9/48* (2013.01); *G06K 9/6202* (2013.01); *G06Q 30/0635* (2013.01); *G06T 7/90* (2017.01); *G06K 2209/25* (2013.01)

(56) References Cited

U.S. PATENT DOCUMENTS

| | | | |
|---|---|---|---|
| 8,965,460 B1* | 2/2015 | Rao .......................... | G06F 3/005 455/566 |
| 9,063,953 B2* | 6/2015 | Hull ........................ | G06F 21/78 |
| 9,122,706 B1* | 9/2015 | Holzschneider ........ | G06F 16/51 |
| 9,152,868 B2* | 10/2015 | Smowton .............. | H04L 9/3231 |
| 9,280,560 B1* | 3/2016 | Dube ................ | G06K 9/00523 |
| 9,684,826 B2* | 6/2017 | Dubuque ........... | G06K 9/00536 |
| 2013/0088490 A1 | 4/2013 | Rasmussen et al. | |
| 2014/0253707 A1 | 9/2014 | Gangadhar | |
| 2015/0055085 A1 | 2/2015 | Fonte et al. | |
| 2016/0295038 A1* | 10/2016 | Rao ........................ | G06F 3/005 |
| 2019/0156146 A1* | 5/2019 | Sahler .................. | G06K 9/6215 |

OTHER PUBLICATIONS

Nodari, et al.: "A Mobile Visual Search Application for Content Based Image Retrieval in the Fashion Domain", Content-Based Multimedia Indexing (CBMI), 2012 10th International Workshop on, IEEE, Jun. 27, 2012, pp. 1-6, XP032230295.

Amir Zafar Asoodeh: "Face and Frame Classification Using Geometric Features for a Data-Driven Eyeglass Recommendation System", Thesis, Concordia University, Jan. 19, 2015, pp. 1-59, XP055227456.

Diana Borza et al: "Eyeglasses Lens Countour Extraction from Facial Images Using an Efficient Shape Description", Sensors, vol. 13, No. 10, Oct. 10, 2013, pp. 13638-13658, XP055277455.

* cited by examiner

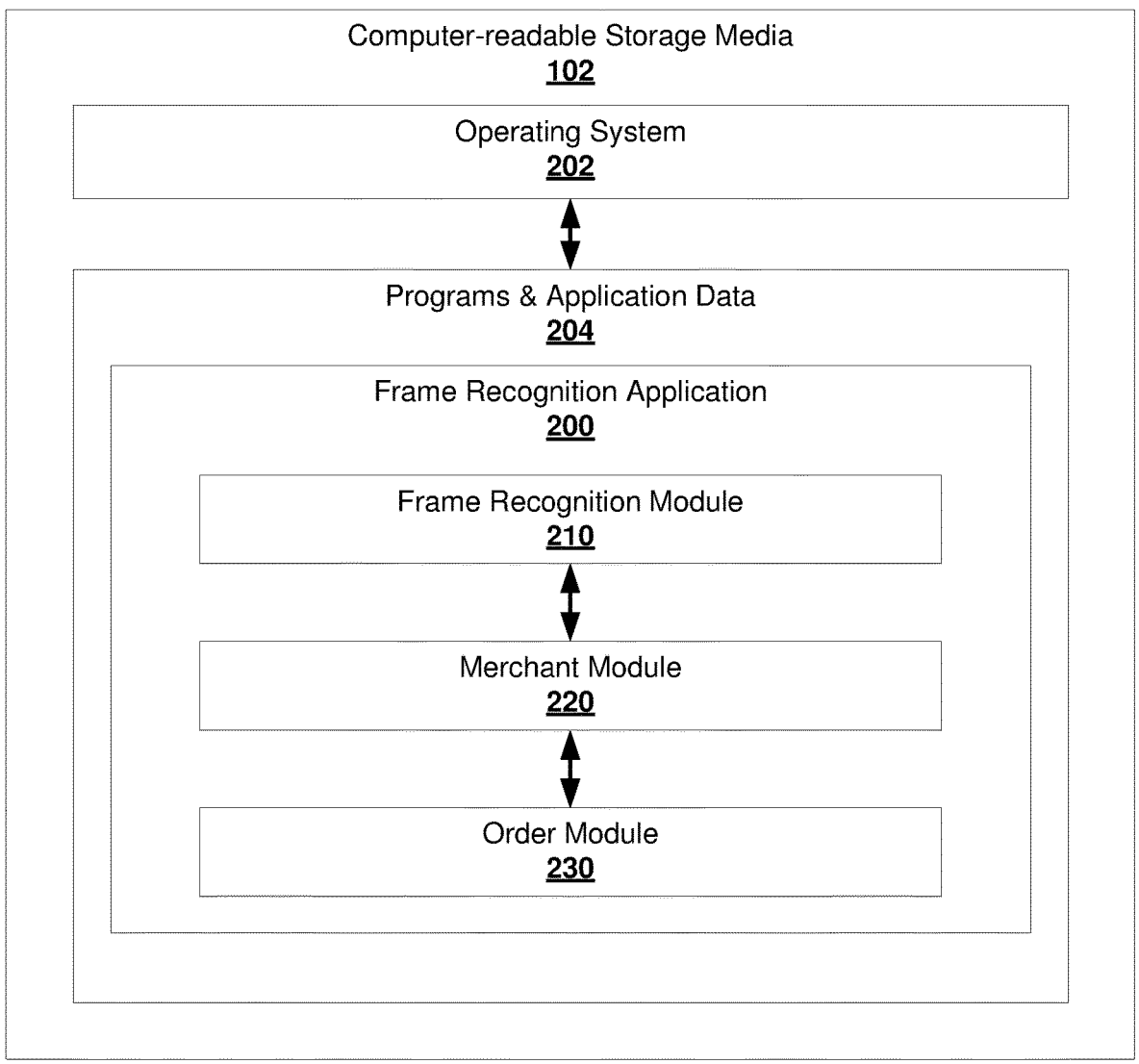

FRAME RECOGNITION SYSTEM AND METHOD

BACKGROUND

The present disclosure relates generally to systems and methods for providing frame recognition that is captured in an image.

Today, when a consumer wants to identify a particular frame seen in an image, a movie, or in person, the consumer must manually perform a search either online or using physical catalogs to identify the frame or find similar looking frames. This is often a tedious task as it is not easy to find an exact match or even similarly looking frames based off of an image. For example, entering the search term "black frame glasses" into a popular search engine will return almost 50,000,000 results referencing black frame glasses of various sizes and shapes. The current process would require a consumer to manually compare the frame in the image to possibly thousands of similar frames.

BRIEF SUMMARY OF THE DISCLOSED EMBODIMENTS

The disclosed embodiments provide an improved method for enabling consumers to identify and purchase a desired frame. For example, the disclosed embodiments include a frame recognition system comprising memory for storing computer executable instructions and data. The frame recognition system further includes at least one processor for executing the computer executable instructions. In one embodiment, the computer executable instructions comprises instructions for receiving an image; identifying a frame image from the image; performing image recognition using the frame image to identify a plurality of frames; retrieving merchant information corresponding to the plurality of frames; receiving merchant information associated with the plurality of frames; presenting the plurality of frames and the merchant information associated with the plurality of frames; receiving order information in response to a user ordering a frame from the plurality of frames; and processing the order information.

In certain embodiments, the frame recognition system may operate over a network and provide the services disclosed herein to remote client devices. Alternatively, in some embodiments, the disclosed embodiments may be incorporated within an end user or client device such as, but not limited to, a mobile device including a smart phone, tablet, or mobile computing device.

Additional details of the disclosed embodiments are provided below in the detailed description and corresponding drawings.

BRIEF DESCRIPTION OF THE DRAWINGS

Illustrative embodiments of the present invention are described in detail below with reference to the attached drawing figures, which are incorporated by reference herein, and wherein:

FIG. 2 is a block diagram that conceptually illustrates certain components of a frame recognition application in accordance with one embodiment;

The illustrated figures are only exemplary and are not intended to assert or imply any limitation with regard to the environment, architecture, design, or process in which different embodiments may be implemented.

DETAILED DESCRIPTION

Figure 1:
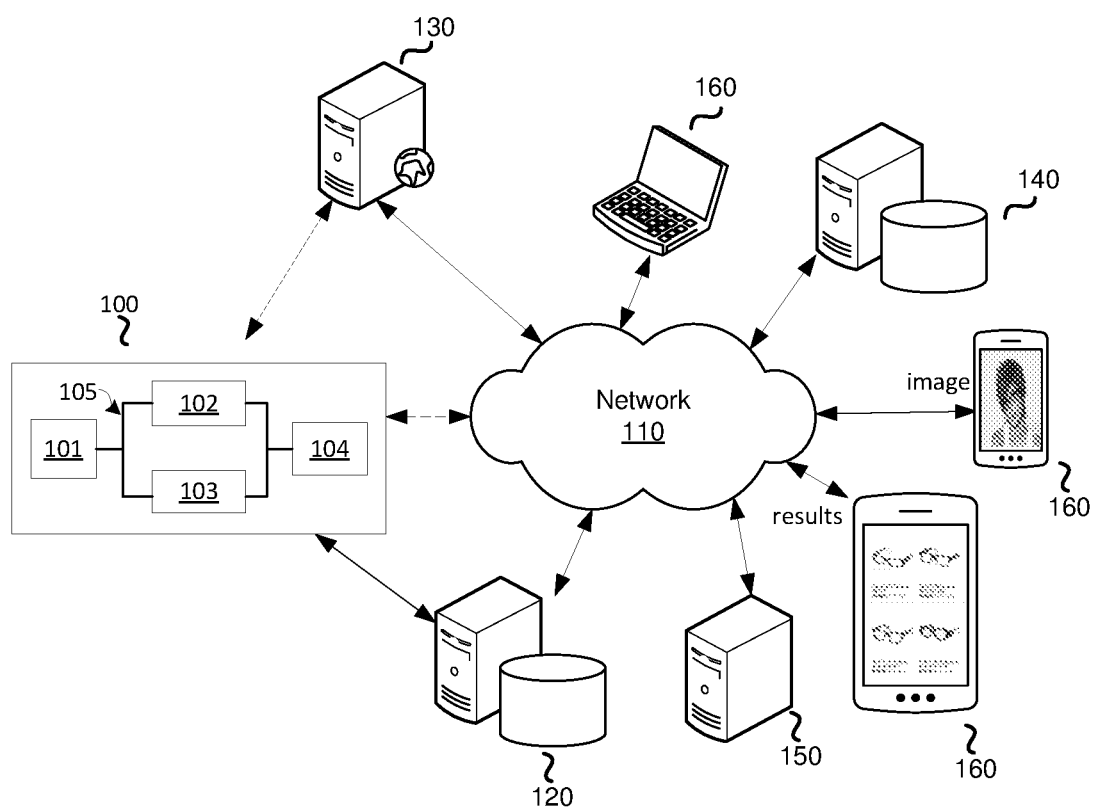
FIG. 1 illustrates a system for providing frame recognition in accordance with one embodiment.

FIG. 1 illustrates a system for providing frame recognition in accordance with one embodiment. In the depicted embodiment, the system 100 may communicate over a communication network 110 with a number of other devices including, but not limited to, a frames database 120, a web server 130, a merchant database 140, and one or more client devices 160.

The client devices 160 may be any type of user device including, but not limited to, a personal computer, mobile computer, laptop, smartphone, smartwatch, and a personal digital assistant. In one embodiment, the client device 160 preferably includes a display screen and an image capturing device such as a camera or video recorder.

The communication network 110 may be any type of wired or wireless connection, which may include one or more public or private networks or some combination thereof, such as the Internet, an intranet, a mobile cellular or data network, or any other network operable to transmit data to and from the system 100.

In one embodiment, the system 100 comprises components including one or more processors 101, a computer-readable storage media 102, an input/output interface 103, and a network interface 104. Each of the components of the system 100 communicates via a systems bus 105 that transfers data between the components. The processors 101 may be of any type and having any number of cores. The processors 101 are configured to process data and execute computer-executable instructions. These instructions may include, but are not limited to, machine code instructions, bytecode for a software interpreter, object code, and source code in a high-level programming language.

Data and computer-executable instructions are stored in the computer-readable storage media 102. The computer-readable storage media 102 may be any appropriate memory device or computer storage media, such as, but not limited to, a hard disk drive, random access memory, read only memory, electrically erasable programmable read-only memory, flash memory or other memory technology, compact disc-read only memory, digital versatile disks or other optical disk storage, magnetic cassettes, magnetic tape, magnetic disk storage or other magnetic storage devices. In some embodiments, the data and executable instructions may be stored on a device that is external to the system 100 such as, but not limited to, being stored on a network device or on an external memory drive.

The input/output (I/O) interface 103 comprises an input interface for receiving user input or data from one or more peripheral devices. For example, the I/O interface 103 may receive user input or data from one or more input devices such as, but not limited to, a keyboard, mouse, touch screen, microphone, scanner, and/or a camera. The I/O interface 103 also comprises an output interface for outputting information to one or more device or component associated with the system 100. For example, the I/O interface 103 may output data or other information to a display device for displaying information to a user, another system, and/or to a printer.

The network interface 104 may include one or more wired or wireless interfaces such as, for example, an Ethernet port or a wireless transceiver for enabling the system 100 to send and receive data over the network 110. The network interface 104 is not limited to any particular communication protocol or hardware interface.

For example, in one embodiment, the system 100 may communicate with the frames database 120 over the network 110. The frames database 120 contains information corresponding to a plurality of frames such as, but not limited to, frame measurements, material and color information, and brand and design information. All frame within the frames database 120 are pre-stored with a set of features as described above. As will be further described, the information contained in the frames database 120 is used in identifying a frame or similar frames to a frame depicted in an image such as a picture or video. The frames database 120 may be provided and/or maintained by a single entity (e.g., by a provider of the system 100) or by a combination of entities including one or more independent third parties or vendors. Still, in certain embodiments, the system 100 may store the frames data in a local data storage unit or database to eliminate the need to access the network 110 to retrieve the data from the frames database 120.

The network interface 104 may also enable the system 100 to communicate with other devices over the network 110. For example, in certain embodiments, the system 100 may communicate with a web server 130 for providing the services disclosed herein as a web application or website (also commonly referred to as a webpage or web portal) to one or more client device 160. For instance, in some embodiments, the system 100 may operate as a back end server that processes and provides all the services described herein, while the web server 130 provides the front end services of gathering and displaying information using one or more user interfaces/webpages. Typically, the client device 160 may access the webpage or web application using a web browser application.

Still, in certain embodiments, the system 100 may provide services to the one or more clients 160 directly without the use of the web server 130 or other intermediate servers. For example, in one embodiment, the client device 160 may have a software application installed on the device that provides the interface and instructions for communicating with the system 100 directly through use of the software application. For instance, in one embodiment, a smart phone may include a mobile application that enables the services disclosed herein.

Additionally, in alternative embodiments, the system 100 may be a client or end user device such as but not limited to a personal computer, mobile computer, laptop, smart phone, personal digital assistant, or any other computing device that has locally stored computer executable instructions for providing frame recognition in accordance with the embodiments disclosed herein. For instance, alternatively to or in addition to providing the embodiments disclosed herein as an online tool or application, in certain embodiments, the embodiments described herein may be locally installed on a client/end-user computing device as a software application or mobile application. In other words, instead of a network or cloud base application where the frame recognition process is performed by a network device and results are sent to the end user device, in some embodiments, the frame recognition process may be performed directly on the end user device. In these embodiments, the frames data may be stored locally on the end user device or the end user device may communicate directly with the frames database 120 in identifying a frame or similar frames to a frame depicted in an image.

Once a matching frame or a plurality of frames similar to a frame depicted in an image is identified, the system 100 may communicate with the merchant database 140 to query for merchant information corresponding to the identified frame or frames. In one embodiment, the system 100 may query a plurality of merchant database 140 to obtain different merchant information corresponding to the identified frame or frames. Alternatively, in some embodiments, the system 100 may query a single merchant database 140 that contains merchant information for a plurality of merchants. Non-limiting examples of merchant information may include a merchant name, a frame cost, availability, location, and a shipping cost. For example, the location information may provide the location where a frame would ship from. Thus, a user desiring lower shipping cost and faster shipping time may choose a merchant based on location. In some embodiments, the merchant information may also include frame designer information such as, but not limited to, brand and model reference.

Still, in certain embodiments, merchant information may be retrieved from local eye care providers (opticians) located near the user. For example, a local eye care provider to the user may have one or more of the recognized frames in stock. This additional information will also appear within the plurality of frame available to purchase. In one embodiment, the user is able to purchase a desired frame from a local eye care provider online or within the store. This additional feature will further enable the use to more quickly obtained a desired frame.

Additionally, the system 100 may communicate either locally or over the network 110 with any number of other machines/devices 150 such as, but not limited to an email server, accounting system, and an ordering system. For example, in some embodiments, once the one or more frames are identified and merchant information obtained, the system 100 is configured to enable a user to order a desired frame. As will be further described, this ordering process may be handled by external ordering system or may be configured within the system 100. Similarly, the system 100 may be further configured to communicate with an accounting server for billing a user or an insurance company for an order. An email server may be used to send confirmation and shipping information regarding an order to the user. Other types of messaging services such as, but not limited to, text messaging may also be used to send information to the user.

FIG. 2 is a block diagram that conceptually illustrates certain components of a frame recognition application 200 in accordance with one embodiment. The frame recognition application 200 comprises of data and computer executable instructions stored in the computer-readable storage media 102, such as main memory or a hard drive, that when executed performs the processes disclosed herein. In certain embodiments, the computer-readable storage 102 media may also store data and computer executable instructions associated with an operating system 202 and/or one or more programs/applications 204. Still, in certain embodiments, the frame recognition application 200 may be a component of a larger software application.

In the depicted embodiment, the frame recognition application 200 includes examples of the types of classes, objects, or software modules that may be employed to perform the processes disclosed herein. For instance, in one embodiment, the frame recognition application 200 may include a frame recognition module 210, a merchant module 220, and an order 230.

In one embodiment, the frame recognition module 210 includes data and executable instructions for identifying a matching frame or similar frames to a frame depicted in an image. The term image as used herein includes a stored image, a real-time image captured using a camera, a network image, a still-frame, and a video. For example, in one embodiment, a user may use an image capturing device such as a camera for taking a picture or video of a frame or someone wearing a particular frame. The frame recognition module 210 may also be configured to receive scenes from a movie, a picture from the Internet, or an image previously stored on a user's device.

In one embodiment, the frame recognition module 210 may include instructions for receiving the image from the client device 160. Alternatively, the frame recognition module 210 may include instructions for retrieving an image from an image location. For example, in one embodiment, the frame recognition module 210 may include instructions for retrieving an image from a particular website address, URL, or from an image repository.

Once the frame recognition module 210 obtains the image, the frame recognition module 210 includes instructions for identifying a frame image from the image. A frame image is an image of a frame depicted in the image. A frame as used herein includes any lenses that accompany the frame of an eyewear. Non-limiting examples of frames include prescription glasses, ornamental eyewear, and sunglasses.

In one embodiment, the frame recognition module 210 may receive an image of just the frame or may receive an image of a person wearing the frame. In one embodiment, for images containing a person wearing a frame, the frame recognition module 210 identifies the frame image by using facial recognition software to identify one or more faces in the image. Once the faces are identified in the image, the frame recognition module 210 includes instructions for determining whether a person in the image is wearing a frame. For example, in one embodiment, the frame recognition module 210 is configured to determine whether a person is wearing a frame by identifying a consistent change in color between a person's forehead region and eye region, or along the nasal bridge. Other methods for identifying a frame in the image includes the use of histogram of oriented gradients (HOG), which are feature descriptors used in computer vision and image processing for the purpose of object detection. Still, another method for identifying a frame in the image may include using the Edge detection method to identify points in a digital image at which the image brightness changes sharply or, more formally, has discontinuities.

Once it is determined that a particular person in the image is wearing a frame, the frame recognition module 210 includes instructions for focusing or isolating the image to an area containing the frame image. For example, in one embodiment, the frame recognition module 210 may include instructions for cropping the image to a smaller image containing the frame image. Alternatively, in other embodiments, the frame recognition module 210 may simply zoom in or isolate that particular area of the image without cropping the image. Alternatively, in some embodiments, the frame recognition module 210 includes instructions for enabling a user to crop an image to get a narrow view of the frame, choose between eyeglasses and sunglasses, and choose the gender (man, woman, kid) and so on.

Still, in certain embodiments, the frame recognition module 210 may include instructions for attempting to improve a picture quality of the frame image. For instance, if the frame image is unclear or blurry, the frame recognition module 210 may include instructions for executing certain algorithms to produce a clearer frame image. For example, certain blurred portions of the frame image may be enhanced using the colors identified in other portions of the frame image.

Once the frame recognition module 210 has identified the frame image, the frame recognition module 210 includes instructions for performing image recognition using the frame image to identify a plurality of frames. As used herein, a plurality of frames means one or more frames. For instance, in one embodiment, the frame recognition module 210 may be able to identify the exact frame that is depicted in the frame image. Alternatively, or in addition to, in some embodiments, the frame recognition module 210 may be configured to identify one or more similar frames to that depicted in the frame image.

In one embodiment, the frame recognition module 210 ranks the plurality of frames based on the results of the image recognition, with the most similar frames to the depicted frame in the frame image having the highest rank. For example, if an exact match to the depicted frame in a frame image is found, the exact match would be ranked highest. The plurality of frames is then presented in accordance with the ranking from highest to lowest.

Figure 3A:
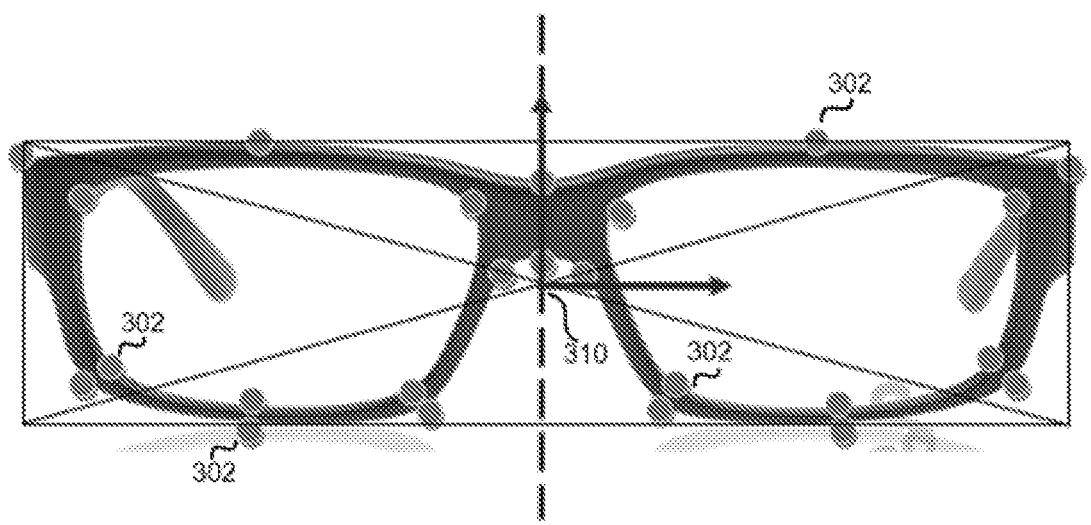
FIGS. 3A and 3B depict various coordinate points along a frame for performing frame recognition in accordance with one embodiment.
Figure 3B:
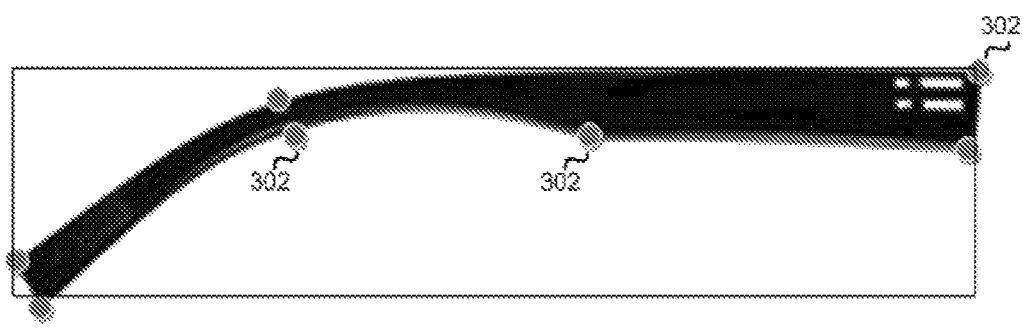

In accordance with the disclosed embodiments, the frame recognition module 210 may include various algorithms for performing the image recognition procedure. For example, in one embodiment, the frame recognition module 210 may include instructions for identifying certain coordinate points on the frame image. For example, FIGS. 3A and 3B depict various coordinate points 302 along a frame. In one embodiment, the coordinate points of the frame image are measured along a coordinate system 310 along the center point of the frame as illustrated in FIG. 3A.

In certain embodiments, the frame recognition module 210 may include instructions for determining missing coordinate points that are not visible on the frame image by using frame and eyewear symmetry property. For example, because a frame has a symmetric shape, the frame recognition module 210 may include instructions for modeling the entire frame with only a portion of the frame in the event only a portion of the frame is visible in the frame image due to an angle of the image or other obstruction. For instance, in certain embodiments, the frame recognition module 210 may use linear interpolation to find unknown points.

In one embodiment, the frame recognition module 210 takes these measurements and compares them to information contained in the frames database 120. As stated previously, the frames database 120 includes parameters that contain key information about a plurality of frames. The frame recognition module 210 uses the results of the coordinate points' comparison in identifying the plurality of frames. For example, in one embodiment, a query of the database may return all the frames that have the same key parameters ratio or very close (e.g., an epsilon distance estimated at 0.5 to all the points in all the directions).

Figure 4:
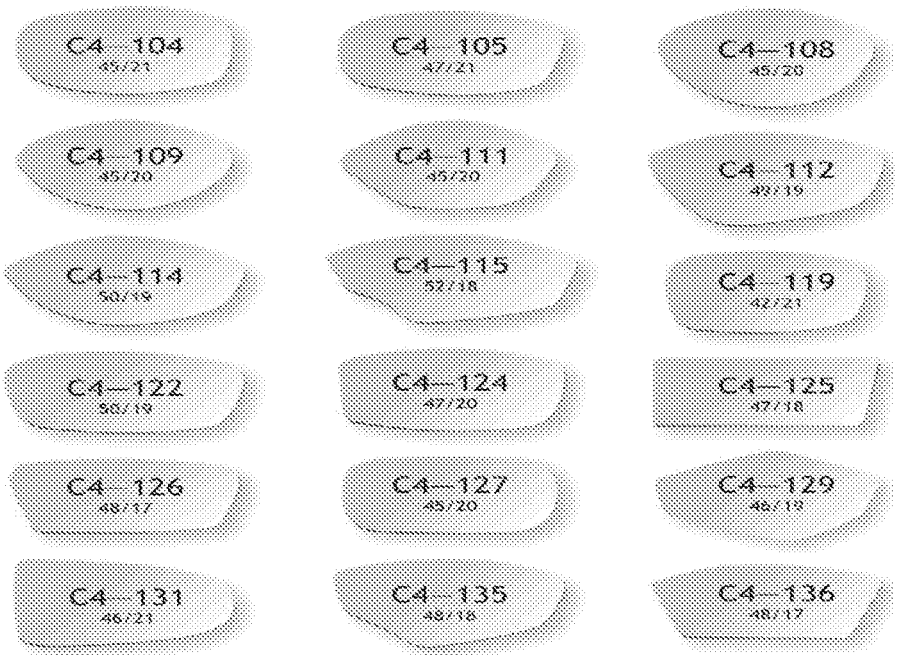
FIG. 4 depict various lens shapes that may be used for comparison in performing frame recognition in accordance with one embodiment.

In addition to the coordinate points, in certain embodiments, the frame recognition module 210 may include instructions for comparing other characteristics of the depicted frame in the frame to parameters in the frames database 120. These other characteristics include, but are not limited to, the frame color or colors and their proportions (e.g., Black 86%+Blue 14%), a logo, and the shape, transparency, brightness, colors, gradients or tint of a lens. For instance, the shape of the lens may be extremely useful in identifying rimless frames. Non-limiting examples of lens shape that may be used for comparison are depicted in FIG. 4. Using these additional characteristics, the frame recognition module 210 may improve the ranking or identify an exact matching frame.

In one embodiment, if the frame recognition module 210 is unable to find any matching frames such as in the case that the image is of such poor quality that a frame image cannot be identified, the frame recognition module 210 may include instructions for providing a search interface for enabling a user to search for similar frames. For example, the search interface may include defined fields in which the user may enter or select a brand, model, color, texture, size, and shape. In one embodiment, the search interface is configured to search directly within the frames database 120.

Still, in certain embodiments, the frame recognition module 210 may include instructions for receiving a second image depicting the frame image at a second perspective view different from a first perspective view of the frame image in the first image. The frame recognition module 210 may be configured to use the second image depicting the frame image at the second perspective view along with the first perspective view of the frame image in the first image in identifying the plurality of frames. For example, in one embodiment, the frame recognition module 210 uses the frame image at the second perspective view to complete missing portions of the depicted frame in the first frame image. For instance, the second image may provide a clear view of the temple of the frame or a logo that is obscured in the first image of the frame.

In one embodiment, once an exact match or a plurality of frames having similar aesthetics to the depicted frame in the frame image is identified, the merchant module 220 may include instructions for retrieving merchant information corresponding to the plurality of frames. For example, in one embodiment, the merchant module 220 includes instructions for querying one or more databases containing merchant or vendor information for retrieving the merchant information corresponding to the plurality of frames. As stated above, non-limiting examples of merchant information may include a merchant name, a frame cost, availability, location, and a shipping cost. Once the merchant information is obtained, the merchant module 220 may include instructions for presenting the plurality of frames and their corresponding merchant information to a user.

In some embodiments, the merchant module 220 may include instructions for enabling a user to virtually try on one or more frames. For example, in one embodiment, the merchant module 220 may include instructions for superimposing a selected frame on top of a stored image of the user. Alternatively, the merchant module 220 may include instructions for displaying a selected frame on a display screen of a user's device; activating a camera on an electronic device associated with the display screen; and enabling the user to position his/her face using the camera such that the selected frame is displayed on top of his/her face. In some embodiments, the user can save this virtual image. In certain embodiments, the merchant module 220 may include instructions or a link for enabling a user to post one or more images to social media site such as, but not limited to, Facebook® or Instagram®. For example, in one embodiment, the merchant module 220 may include instructions for selecting a desired frame for purchase based on the greatest numbers of likes received on the social media site.

In one embodiment, the order module 230 may include instructions for enabling a user to order a desired frame from the plurality of frames. For example, in one embodiment, the order module 230 may include instructions for receiving and processing the customer financial information, receiving insurance information, receiving shipping information, providing order and shipping confirmation, and receiving prescription lens information including adding any special services such as, but not limited to, anti-glare, anti-scratch, and transition lenses. In certain embodiments, one or more ordering information may be automatically retrieved from a source rather than a user having to manually enter the information. For example, in one embodiment, prescription information may be retrieved from memory if previously stored or from other data sources such as, but not limited to, an eye care provider system. In certain embodiments, the user may choose to have the frame sent directly to the user or sent to an eye care provider location for pick up.

Figure 5:
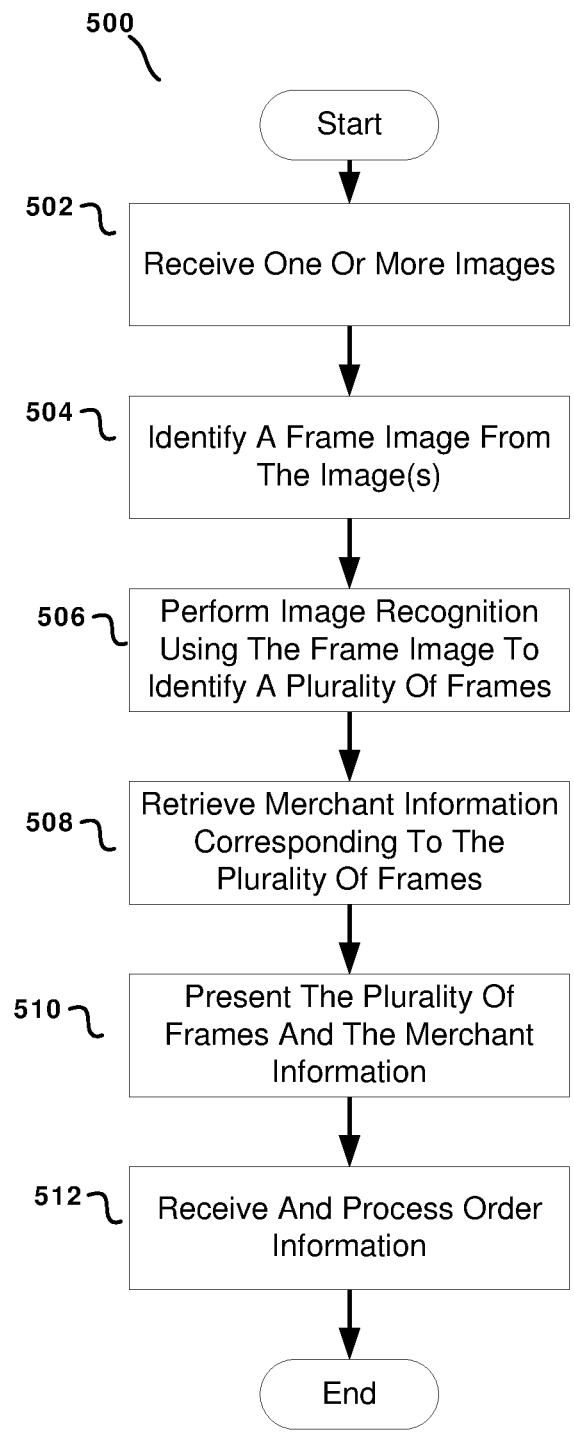
FIG. 5 is a flowchart illustrating a process for performing frame recognition in accordance with one embodiment.

FIG. 5 is a flowchart illustrating a process 500 for providing frame recognition in accordance with one embodiment. The process 500 is implemented in computer executable instructions and executed h the system 100 using one or more processors. The process begins at step 502 by receiving one or more images. As stated above, the images may be still images or video images that are either taken in real time or stored images.

At step 504, the process identifies a frame image from the one or more images. In one embodiment, the process may isolate, crop, or perform other enhancements to improve the frame image.

The process at step 506 then performs image recognition using the frame image to identify a plurality of frames. The plurality of frames may include an exact matching frame corresponding to the frame image and/or may include other similarly looking frames. The process of identifying the frames may include identifying coordinate points on the frame image; comparing the coordinate points of the frame image to a database having parameters associated with the plurality of frames; and using results of the coordinate points comparison in identifying the plurality of frames. In some embodiments, in identifying the coordinate points on the frame image, the process may be configured to determine missing coordinate points not visible on the frame image by using frame and eyewear symmetry property.

In some embodiments, the process of performing image recognition to identify the frame may also include identifying color characteristics of the frame image; comparing the color characteristics of the frame image to the database having parameters associated with the plurality of frames; and using results of the color characteristics comparison in identifying the plurality of frames. Still, in certain embodiments, the process of performing image recognition to identify the frame may also include identifying lens characteristics of the frame image; comparing the lens characteristics of the frame image to the database having parameters associated with the plurality of frames; and using results of the lens characteristics comparison in identifying the plurality of frames. In one embodiment, the lens characteristics comprise shape, transparency, brightness, colors and gradients of the lens.

In addition, in some embodiments, the process of performing image recognition to identify the frame may also include identifying texture characteristics of the frame image; comparing the texture characteristics of the frame image to the database having parameters associated with the plurality of frames; and using results of the texture characteristics comparison in identifying the plurality of frames.

For example, in some embodiments, texture descriptors like Discrete Fourier Transform (DFT) or Gabor filter may be used to recognize wood, plastic, metal, titanium and so on.

Further, in some embodiments, the process of performing image recognition to identify the frame may also include identifying other characteristics of the frame image, wherein the other characteristics include a logo; comparing the other characteristics of the frame image to the database having parameters associated with the plurality of frames; and using results of the other characteristics comparison in identifying the plurality of frames.

Once the plurality of frames is identified, the process at step 508 retrieves merchant information corresponding to the plurality of frames. In one embodiment, this may be performed by querying one or more vendor or merchant databases containing frame information. In some embodiments, the process may query for merchant information by using a search engine to search for a particular brand or model of a frame.

At step 510, the process presents the plurality of frames and the merchant information associated with the plurality of frames. For instance, if the process is being performed on a network server, the process sends the data back to the end user's device for enabling the end user's device to display the plurality of frames and the merchant information associated with the plurality of frames. However, in embodiments where the process is being performed directly on the end user's device, the process simply displays the plurality of frames and the merchant information on the end user's device.

At step 512, if a user decides to purchase a particular frame, the process receives and processes the order information in response to a user ordering the frame. For example, in one embodiment, the process will place the order with a vendor, send prescription information to an optical lab, and generate a shipping request.

Still, in certain embodiments, the process may include an optional user feedback step (not depicted) in which the process may receive user feedback regarding the user's experience with the disclosed embodiments. For example, feedback may be obtained on whether the user thinks that the correct or similar frame to the depicted frame was recognized. In one embodiment, this feedback may be used to improve the image recognition system. In certain embodiments, the feedback may be more detailed such as, but not limited to, providing a reason as to why the wrong frame was recognized by the system. For example, the user may indicate that the wrong color of frames were recognized by the system.

Accordingly, the disclosed embodiments provide a technical solution to the problems associated with identifying a frame seen in an image, on a person, in a movie, etc. Advantages of the disclosed embodiments include enabling a consumer to quickly identify and purchase a frame or similar frames to that of a frame captured in an image. Additionally, the disclosed embodiments provide an additional revenue stream for eyewear providers, and may reduce the time eye-care providers spend with patients searching for a desired frame.

The above disclosed embodiments has been presented for purposes of illustration and to enable one of ordinary skill in the art to practice the disclosed embodiments, but is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/blocks may be performed in parallel or out of sequence, or combined into a single step/block. The scope of the claims is intended to broadly cover the disclosed embodiments and any such modification.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

Additionally, although specific terms are employed herein, they are used in a generic and descriptive sense only and not for purposes of limitation. For instance, the term database, as used herein, is intended to include any form of organized data, including, but not limited to, data found in tables, charts, spreadsheets, and documents. Furthermore, the term database does not imply the use of a particular or specialized database software nor does it imply the use of any particular data structure.

What is claimed is:

1. A system configured to provide frame recognition, the system comprising:
    memory for storing computer executable instructions and data; and
    a processor for executing the computer executable instructions, wherein the computer executable instructions comprises instructions for:
    receiving an image;
    identifying a frame image from the image;
    performing image recognition using the frame image to identify a plurality of frames;
    retrieving merchant information corresponding to the plurality of frames:
presenting the plurality of frames and the merchant information associated with the plurality of frames;
    receiving order information in response to a user ordering a frame from the plurality of frames; and
    processing the order information,
    wherein performing image recognition using the frame image to identify the plurality of frames includes instructions for:
    identifying coordinate points on the frame image:
comparing the coordinate points of the frame image to a database having parameters associated with the plurality of frames; and
    using results of the coordinate points comparison in identifying the plurality of frames.

2. The system of claim 1, wherein performing image recognition using the frame image to identify a plurality of frames comprises instructions for:
    identifying color characteristics of the frame image;
    comparing the color characteristics of the frame image to the database having parameters associated with the plurality of frames; and
    using results of the color characteristics comparison in identifying the plurality of frames.

3. The system of claim 2, wherein performing image recognition using the frame image to identify a plurality of frames comprises instructions for:
    identifying lens characteristics of the frame image;

comparing the lens characteristics of the frame image to the database having parameters associated with the plurality of frames; and using results of the lens characteristics comparison in identifying the plurality of frames.

4. The system of claim 3, wherein the lens characteristics comprises shape, transparency, brightness, colors and gradients.

5. The system of claim 2, wherein performing image recognition using the frame image to identify a plurality of frames comprises instructions for:

identifying other characteristics of the frame image, wherein the other characteristics include a logo;

comparing the other characteristics of the frame image to the database having parameters associated with the plurality of frames; and using results of the other characteristics comparison in identifying the plurality of frames.

6. The system of claim 1, wherein identifying the coordinate points on the frame image comprises instructions for:

determining missing coordinate points not visible on the frame image by using frame and eyewear symmetry property.

7. The system of claim 1, wherein the computer executable instructions further comprises instructions for enabling the user to virtually try on frames from the plurality of frames.

8. The system of claim 1, wherein the computer executable instructions further comprises instructions for:

ranking frames in the plurality of frames based on performing the image recognition, wherein closer matching frames in the plurality of frames as compared to the frame image receive a higher ranking; and presenting the frames in the plurality of frames from highest to lowest based on the ranking.

9. The system of claim 1, wherein performing image recognition using the frame image to identify a plurality of frames further comprises computer executable instructions for:

receiving a second image depicting the frame image at a second perspective view than a first perspective view of the frame image in the image;

using the second image depicting the frame image at the second perspective view along with the first perspective view of the frame image in the image in identifying the plurality of frames.

10. The system of claim 1, wherein the merchant information includes a merchant name, a frame cost, availability, location, brand and model reference, and a shipping cost.

11. The system of claim 1, wherein the system is at least one of a network server.

12. The system of claim 1, wherein the system is a mobile device.

13. The system of claim 1, wherein the image is selected from a group consisting of: a stored image, a real-time image captured using a camera, a network image, a still-frame, and a video.

14. A computer-implemented method for performing frame recognition, the method comprising:

receiving an image;

identifying a frame image from the image;

performing, using a processor, image recognition using the frame image to identify a plurality of frames;

querying a database for merchant information corresponding to the plurality of frames;

receiving merchant information associated with the plurality of frames;

presenting the plurality of frames and the merchant information associated with the plurality of frames;

receiving order information in response to a user ordering a frame from the plurality of frames; and processing the order information, wherein performing image recognition using the frame image to identify the plurality of frames includes instructions for:

identifying coordinate points on the frame image:

comparing the coordinate points of the frame image to a database having parameters associated with the plurality of frames; and using results of the coordinate points comparison in identifying the plurality of frames.

* * * * *